United States Patent
Wunsche, III et al.

(10) Patent No.: US 11,443,247 B2
(45) Date of Patent: Sep. 13, 2022

(54) VEHICLE PRIORITIZATION FOR VEHICLE-SHARING FLEET

(71) Applicants: DENSO International America, Inc., Southfield, MI (US); DENSO CORPORATION, Kariya (JP)

(72) Inventors: Robert Wunsche, III, Clarkston, MI (US); Mustafa Mahmoud, Northville, MI (US); Christian Munte, Livonia, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 400 days.

(21) Appl. No.: 16/677,099

(22) Filed: Nov. 7, 2019

(65) Prior Publication Data

US 2020/0151625 A1 May 14, 2020

Related U.S. Application Data

(60) Provisional application No. 62/812,131, filed on Feb. 28, 2019, provisional application No. 62/760,613, filed on Nov. 13, 2018.

(51) Int. Cl.
*G06Q 10/02* (2012.01)
*G01C 21/34* (2006.01)
(Continued)

(52) U.S. Cl.
CPC ......... *G06Q 10/02* (2013.01); *G01C 21/3438* (2013.01); *G06N 5/04* (2013.01);
(Continued)

(58) Field of Classification Search
CPC ........ G06Q 10/02; H04W 4/029; H04W 4/40; G01C 21/3438; G06N 5/04; G07C 5/008
(Continued)

(56) References Cited

U.S. PATENT DOCUMENTS

2012/0203599 A1* 8/2012 Choi ............... G06Q 30/02
  705/13
2014/0152254 A1* 6/2014 Juhasz ............ B60L 53/63
  320/109
(Continued)

FOREIGN PATENT DOCUMENTS

CN 108629652 A 10/2018

OTHER PUBLICATIONS

Estimating the environmental benefits of ride-sharing: A case study of Dublin Brian Caulfield * Department of Civil, Structural and Environmental Engineering, Trinity College, Dublin 2, Ireland (Year: 2009).*

(Continued)

*Primary Examiner* — Zeina Elchanti
(74) *Attorney, Agent, or Firm* — Harness, Dickey & Pierce, P.L.C.

(57) ABSTRACT

A method and system are disclosed and include obtaining, using a processor configured to execute instructions stored in a nontransitory computer-readable medium and in response to receiving a vehicle-sharing request, contextual information, which includes at least one of (i) vehicle selection history information associated with a vehicle-sharing account corresponding to the vehicle-sharing request, (ii) location information associated with the vehicle-sharing request, and (iii) application information associated with a portable device corresponding to the vehicle-sharing request. The method also includes generating, using the processor, vehicle recommendations based on the contextual information. The method also includes transmitting, using the processor, a first set of vehicle recommendations to the portable device. The method also includes assigning, using the processor and in response to receiving a signal indicating a selection of a vehicle from the first set of vehicle recommendations, the vehicle to a user associated with the vehicle-sharing request.

16 Claims, 6 Drawing Sheets

(51) Int. Cl.
  *G07C 5/00* (2006.01)
  *G06N 5/04* (2006.01)
  *H04W 4/029* (2018.01)
  *H04W 4/40* (2018.01)
(52) U.S. Cl.
  CPC ............ *G07C 5/008* (2013.01); *H04W 4/029* (2018.02); *H04W 4/40* (2018.02)
(58) Field of Classification Search
  USPC .......................................................... 705/5
  See application file for complete search history.

(56) References Cited

U.S. PATENT DOCUMENTS

2015/0206206 A1*  7/2015  Puente ............... G06Q 30/0645
                                                  705/307
2015/0206267 A1*  7/2015  Khanna ................. G06Q 50/30
                                                  705/417

OTHER PUBLICATIONS

International Search Report regarding International Application No. PCT/US2019/061217, dated Mar. 10, 2020.
Written Opinion regarding International Application No. PCT/US2019/061217, dated Mar. 10, 2020.

* cited by examiner

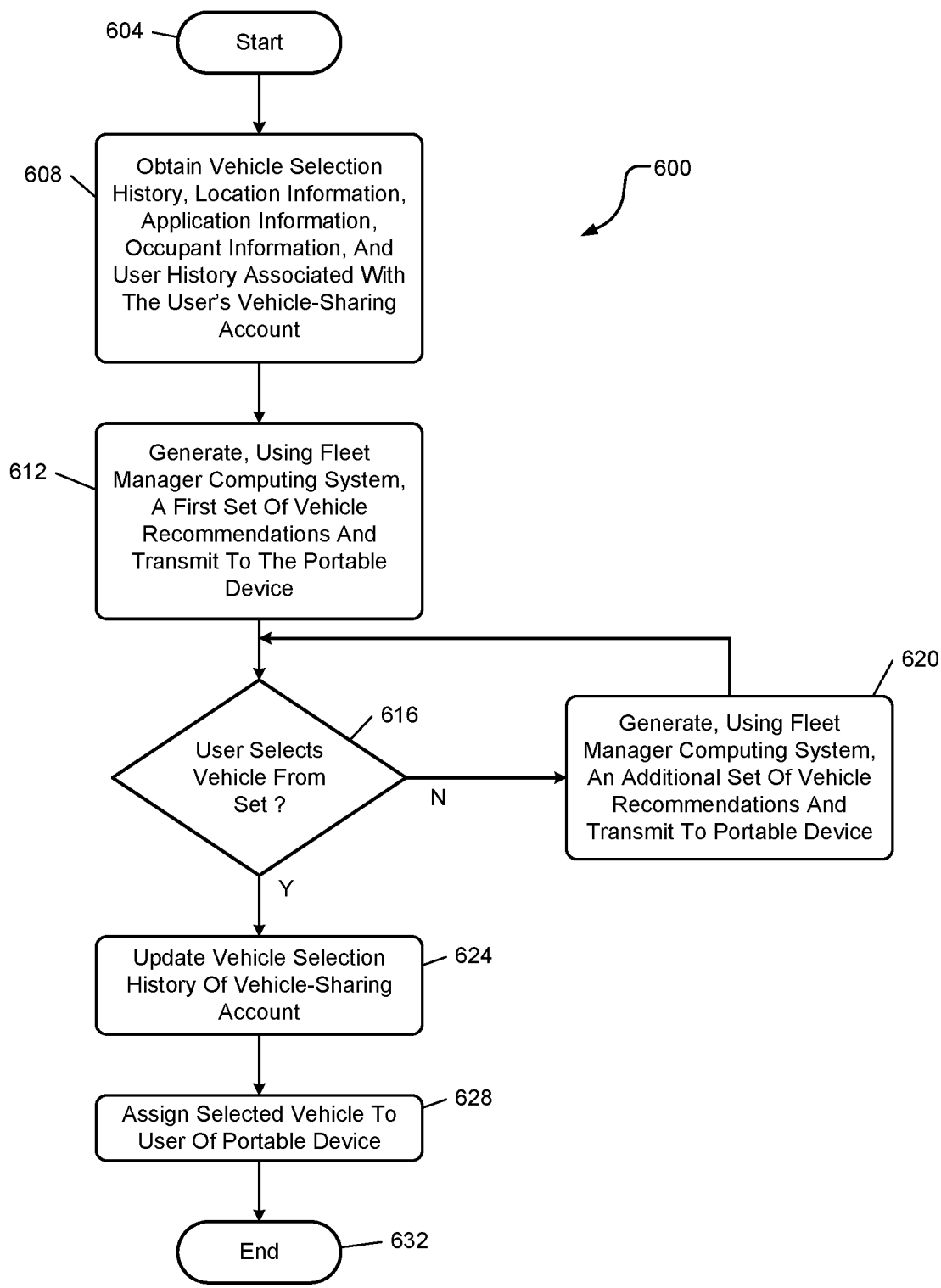

VEHICLE PRIORITIZATION FOR VEHICLE-SHARING FLEET

CROSS-REFERENCE TO RELATED APPLICATIONS

This application claims the benefit of U.S. Provisional Application No. 62/760,613, filed on Nov. 13, 2018, and U.S. Provisional Application No. 62/812,131, filed on Feb. 28, 2019. The entire disclosures of each of the above applications are incorporated herein by reference.

FIELD

The present disclosure relates to vehicle prioritization for a vehicle-sharing fleet.

BACKGROUND

This section provides background information related to the present disclosure and is not necessarily prior art.

Vehicle-sharing fleet managers may have a variety of vehicles that are available to rent for a predefined period of time, such as an hour, using a vehicle-sharing application. Similarly, ride-hailing and ride-sharing fleet managers may have a variety of vehicles that enable users to request a vehicle in order to travel to a specified destination. However, fleet manager computing systems associated with these services lack sufficient and effective vehicle prioritization systems.

SUMMARY

This section provides a general summary of the disclosure, and this section is not a comprehensive disclosure of its full scope or all of its features.

A method is disclosed and includes obtaining, using a processor configured to execute instructions stored in a nontransitory computer-readable medium and in response to receiving a vehicle-sharing request, contextual information, wherein the contextual information includes at least one of (i) vehicle selection history information associated with a vehicle-sharing account corresponding to the vehicle-sharing request, (ii) location information associated with the vehicle-sharing request, and (iii) application information associated with a portable device corresponding to the vehicle-sharing request. The method also includes generating, using the processor, vehicle recommendations based on the contextual information. The method also includes transmitting, using the processor, a first set of vehicle recommendations to the portable device. The method also includes assigning, using the processor and in response to receiving a signal indicating a selection of a vehicle from the first set of vehicle recommendations, the vehicle to a user associated with the vehicle-sharing request.

In some embodiments, the method further comprises updating, using the processor and in response to assigning the vehicle to the user, the vehicle selection history information associated with the vehicle-sharing account based on the vehicle.

In some embodiments, the method further comprises generating, using the processor and in response to receiving a signal indicating a non-selection of each vehicle of the first set of vehicle recommendations, a second set of vehicle recommendations based on the contextual information.

In some embodiments, the contextual information includes user history information associated with the vehicle-sharing account. The user history information indicates at least one of: date information associated with prior vehicle-sharing sessions and time information associated with the prior vehicle-sharing sessions.

In some embodiments, the user history information indicates at least one of occupancy information associated with the prior vehicle-sharing sessions and integrated transportation service history associated with the prior vehicle-sharing sessions.

In some embodiments, the location information indicates at least one of an originating location associated with the vehicle-sharing request and a destination associated with the vehicle-sharing request.

In some embodiments, the location information is associated with at least one of an originating location type associated with the vehicle-sharing request and a destination type associated with the vehicle-sharing request.

In some embodiments, the vehicle selection history information indicates vehicle information associated with prior vehicle-sharing sessions. The vehicle information indicates at least one of a size of vehicles used during the prior vehicle-sharing sessions and an occupancy of vehicles used during the prior vehicle-sharing sessions.

In some embodiments, the vehicle information indicates at least one of a fuel efficiency of vehicles used during the prior vehicle-sharing sessions and a type of vehicle used during the prior vehicle-sharing sessions.

In some embodiments, the application information includes information from at least one of a calendar application of the portable device and a messaging application of the portable device.

A system is also disclosed and includes a processor configured to execute instructions stored in a nontransitory computer-readable medium. The instructions include, in response to receiving a vehicle-sharing request, obtaining contextual information, wherein the contextual information includes at least one of (i) vehicle selection history information associated with a vehicle-sharing account corresponding to the vehicle-sharing request, (ii) location information associated with the vehicle-sharing request, and (iii) application information associated with a portable device corresponding to the vehicle-sharing request. The instructions also include generating vehicle recommendations based on the contextual information; transmitting a first set of vehicle recommendations to the portable device; and in response to receiving a signal indicating a selection of a vehicle from the first set of vehicle recommendations, assigning the vehicle to a user associated with the vehicle-sharing request.

In some embodiments, the instructions further comprise, in response to assigning the vehicle to the user, updating the vehicle selection history information associated with the vehicle-sharing account based on the vehicle.

In some embodiments, the instructions further comprise, in response to receiving a signal indicating a non-selection of each vehicle of the first set of vehicle recommendations, generating a second set of vehicle recommendations based on the contextual information.

In some embodiments, the contextual information includes user history information associated with the vehicle-sharing account. The user history information indicates at least one of date information associated with prior vehicle-sharing sessions and time information associated with the prior vehicle-sharing sessions.

In some embodiments, the user history information indicates at least one of occupancy information associated with the prior vehicle-sharing sessions and integrated transportation service history associated with the prior vehicle-sharing sessions.

In some embodiments, the location information indicates at least one of an originating location associated with the vehicle-sharing request and a destination associated with the vehicle-sharing request.

In some embodiments, the location information is associated with at least one of an originating location type associated with the vehicle-sharing request and a destination type associated with the vehicle-sharing request.

In some embodiments, the vehicle selection history information indicates vehicle information associated with prior vehicle-sharing sessions. The vehicle information indicates at least one of a size of vehicles used during the prior vehicle-sharing sessions; and an occupancy of vehicles used during the prior vehicle-sharing sessions.

In some embodiments, the vehicle information indicates at least one of a fuel efficiency of vehicles used during the prior vehicle-sharing sessions and a type of vehicle used during the prior vehicle-sharing sessions.

In some embodiments, the application information includes information from at least one of a calendar application of the portable device and a messaging application of the portable device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and the drawings are not intended to limit the scope of the present disclosure.

FIG. 6 illustrates an example control algorithm according to the present disclosure.

Corresponding reference numerals indicate corresponding parts throughout the several views of the drawings.

DETAILED DESCRIPTION

Figure 1:
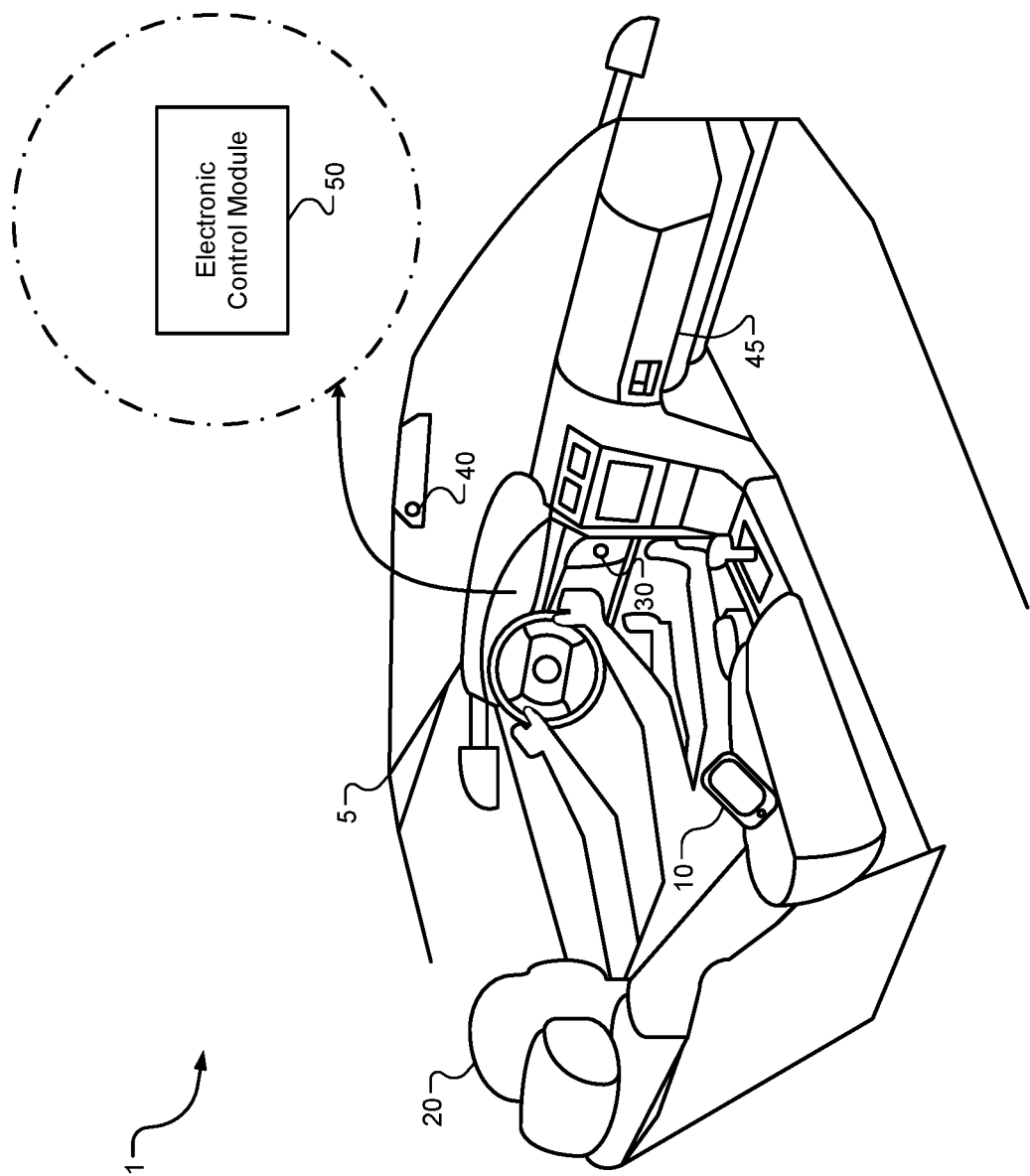
FIGS. 1-4 are example diagrams of a vehicle according to the present disclosure.

Example embodiments will now be described more fully with reference to the accompanying drawings.

With reference to FIGS. 1-4, example illustrations of a system 1 are shown. The system 1 may include a vehicle 5, a portable device 10, an ignition switch 30, an interior camera 40, and a storage compartment 45. In one embodiment, the vehicle 5 is part of a vehicle-sharing fleet. Additionally or alternatively, the vehicle 5 may be part of a ride-sharing fleet and/or a ride-hailing fleet.

The vehicle 5 may include an electronic control module (ECM) 50. As an example, the ECM 50 may be located behind a dashboard of the vehicle 5. While one interior camera 40 is shown in this example, any number of interior cameras 40 can be included within the vehicle 5. Moreover, while the interior camera 40 is located on a rear-view mirror in FIG. 1, the interior camera 40 may be positioned at any suitable location within the interior of the vehicle 5.

The portable device 10 may be any device that is configured to transmit and receive wireless signals, such as a smartphone, smartwatch, wearable electronic device, key fob, tablet device, laptop device, a Bluetooth-enabled device, or other device associated with a user 20 and capable of wireless communication. As described below in further detail, the portable device 10 is configured to generate vehicle-sharing requests via an application executing on the portable device 10. Furthermore, the portable device 10 is configured to receive a digital key associated with the vehicle 5 from a fleet manager computing system (shown below) in response to transmitting the vehicle-sharing request. The digital key enables the user 20 to unlock and enter the vehicle 5. Accordingly, the portable device 10 may include at least one processor that is configured to execute instructions stored in a nontransitory computer-readable medium, such as a random-access memory (RAM) and/or a read-only memory (ROM).

The interior camera 40 may be configured to obtain image data of the user 20. Based on the image data obtained by the interior camera 40 and a vehicle-sharing account associated with the user 20, the ECM 50 may be configured to authenticate the user 20. In order to carry out the functionality of algorithms described herein, the ECM 50 may include at least one processor that is configured to execute instructions stored in a nontransitory computer-readable medium, such as a random-access memory (RAM) and/or a read-only memory (ROM). The ECM 50 may be in communication with the interior camera 40 via a hardware link, such as a local interconnect network (LIN) cable, a controller area network (CAN) cable, an Ethernet cable, or any other suitable hardwire link. In other embodiments, the ECM 50 may be in communication with the interior camera 40 via any suitable telemetric link, such as a Bluetooth link (e.g., Bluetooth low-energy), a Wi-Fi or Wi-Fi direct link, a cellular link, etc. Likewise, the ECM 50 may be in communication with the portable device 10 via any suitable telemetric link, such as a Bluetooth link (e.g., Bluetooth low-energy), a Wi-Fi or Wi-Fi direct link, a cellular/LTE link, etc.

In response to the ECM 50 authenticating the user 20, the ECM 50 may enable the user 20 to activate the vehicle 5. As an example, the ECM 50 may enable the user 20 to retrieve keys stored in the storage compartment 45 (e.g., glove box) of the vehicle 5 for subsequent placement and rotation of the ignition switch 30. Alternatively, the ignition switch 30 may be implemented by a button, and as such, the vehicle 5 may be activated in response to pressing the button and the portable device 10 being located within an activation range of the vehicle 5. Additionally, in response to the ECM 50 authenticating the user 20, the ECM 50 may adjust various vehicle settings according to the vehicle-sharing account associated with the user 20.

Figure 2:
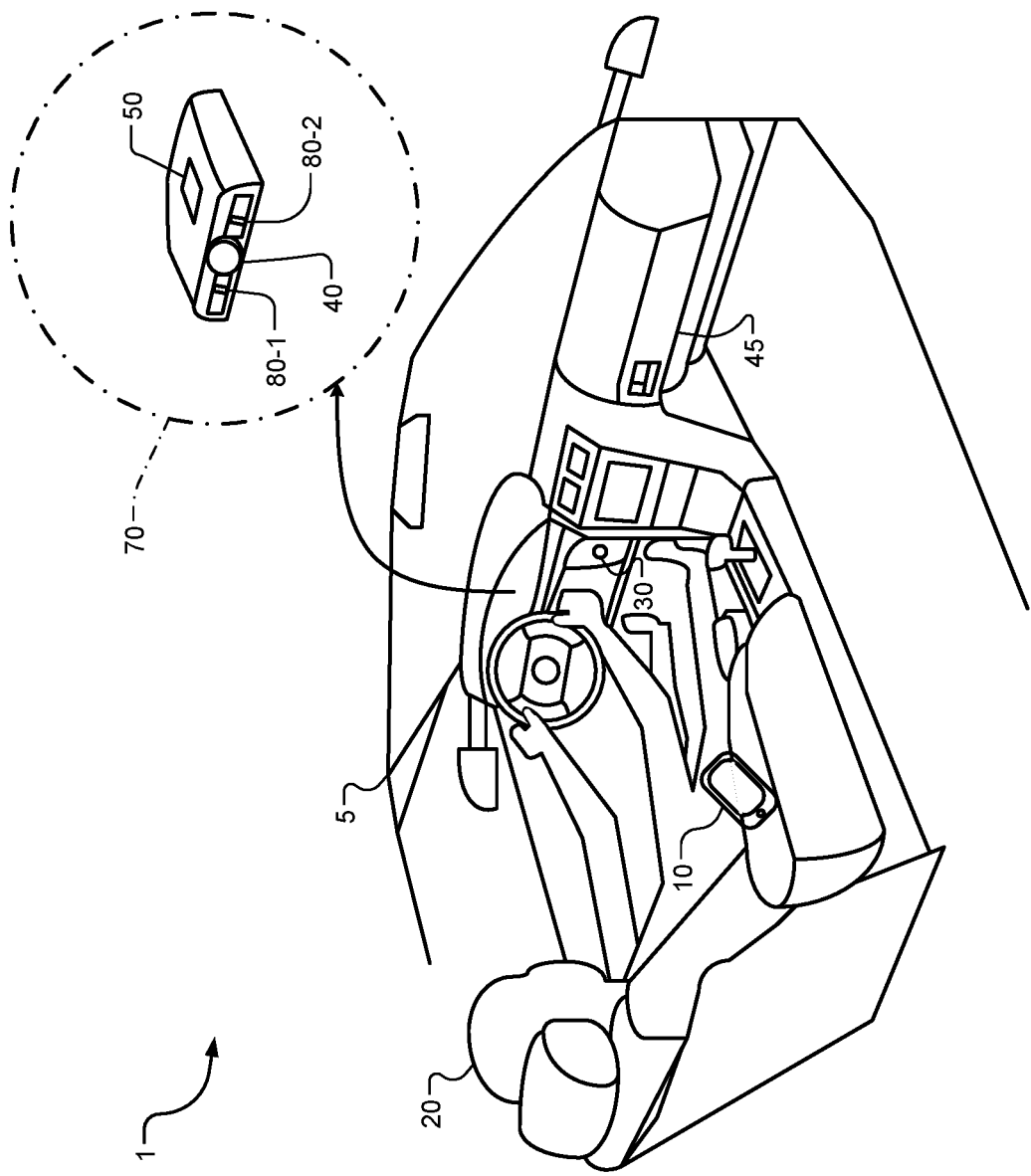

In other embodiments and as shown in FIG. 2, the dashboard may also include a driver status monitor (DSM) 70, which may be mounted over a steering column connected to the steering wheel of the vehicle 5. The DSM 70 may include infrared (IR) sensors 80-1, 80-2 (collectively referred to as IR sensors 80), the interior camera 40, and the ECM 50. The DSM 70 may be configured to obtain facial feature data of the user 20. As an example, the ECM 50 may obtain facial feature data sensed by the IR sensors 80 and the interior camera 40, including images of the face and head of the user 20. Based on the facial feature data, the ECM 50 is configured to, for example, perform a variety of image processing and/or computer vision techniques for facial recognition, as understood by one of ordinary skill in the art.

While the embodiments shown in FIGS. 1-2 include one interior camera 40, in other embodiments, any number of interior cameras 40 may be included within the vehicle 5. Moreover, while the interior camera 40 is included on a rear-view mirror in FIG. 1 and the DSM 70 in FIG. 2, the interior camera 40 may be positioned at any suitable location of the interior of the vehicle 5.

Figure 3:
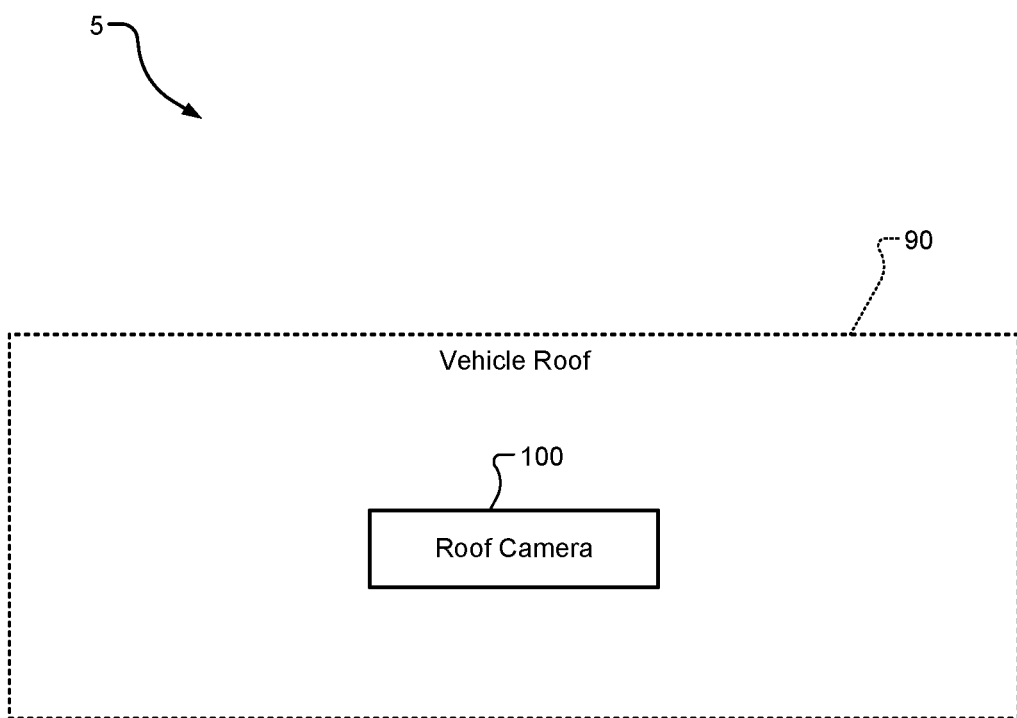
Figure 4:
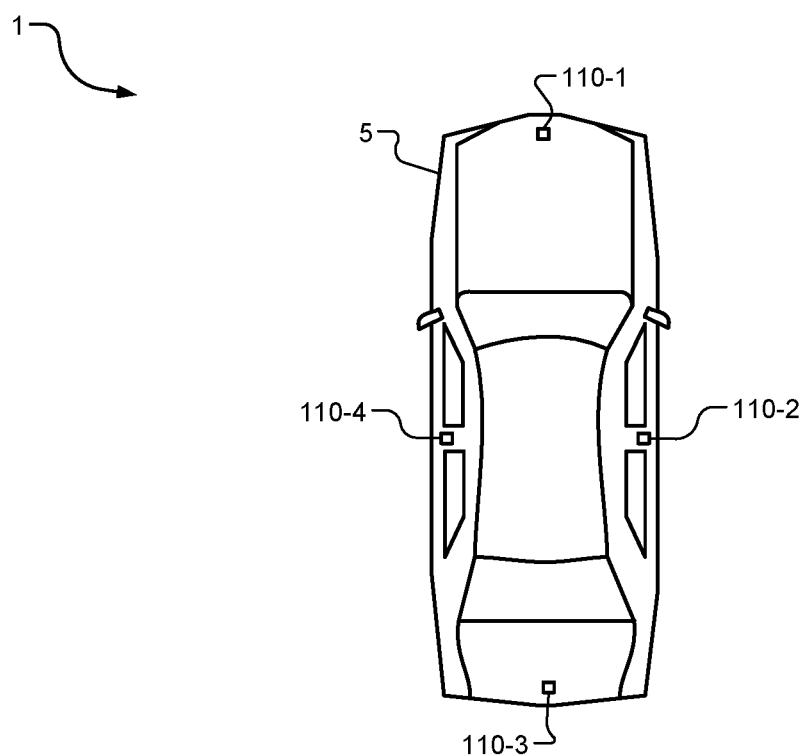

Additionally, a vehicle roof 90 (e.g., a headliner) of the vehicle 5 may include a roof camera value of 100, as shown in FIG. 3. While this embodiment illustrates one roof camera value of 100, in other embodiments, any number of roof cameras 100 may be included on the vehicle roof 90. The roof camera value of 100 is configured to obtain image data representing the interior of the vehicle 5. The ECM 50 may be in communication with the roof camera value of 100 via a hardware link, such as a LIN cable, an Ethernet cable, or any other suitable hardwire link. In other embodiments, the ECM 50 may be in communication with the roof camera value of 100 via any suitable telemetric link, such as a Bluetooth link (e.g., Bluetooth low-energy), a Wi-Fi or Wi-Fi direct link, a cellular link, etc.

Figure 5:
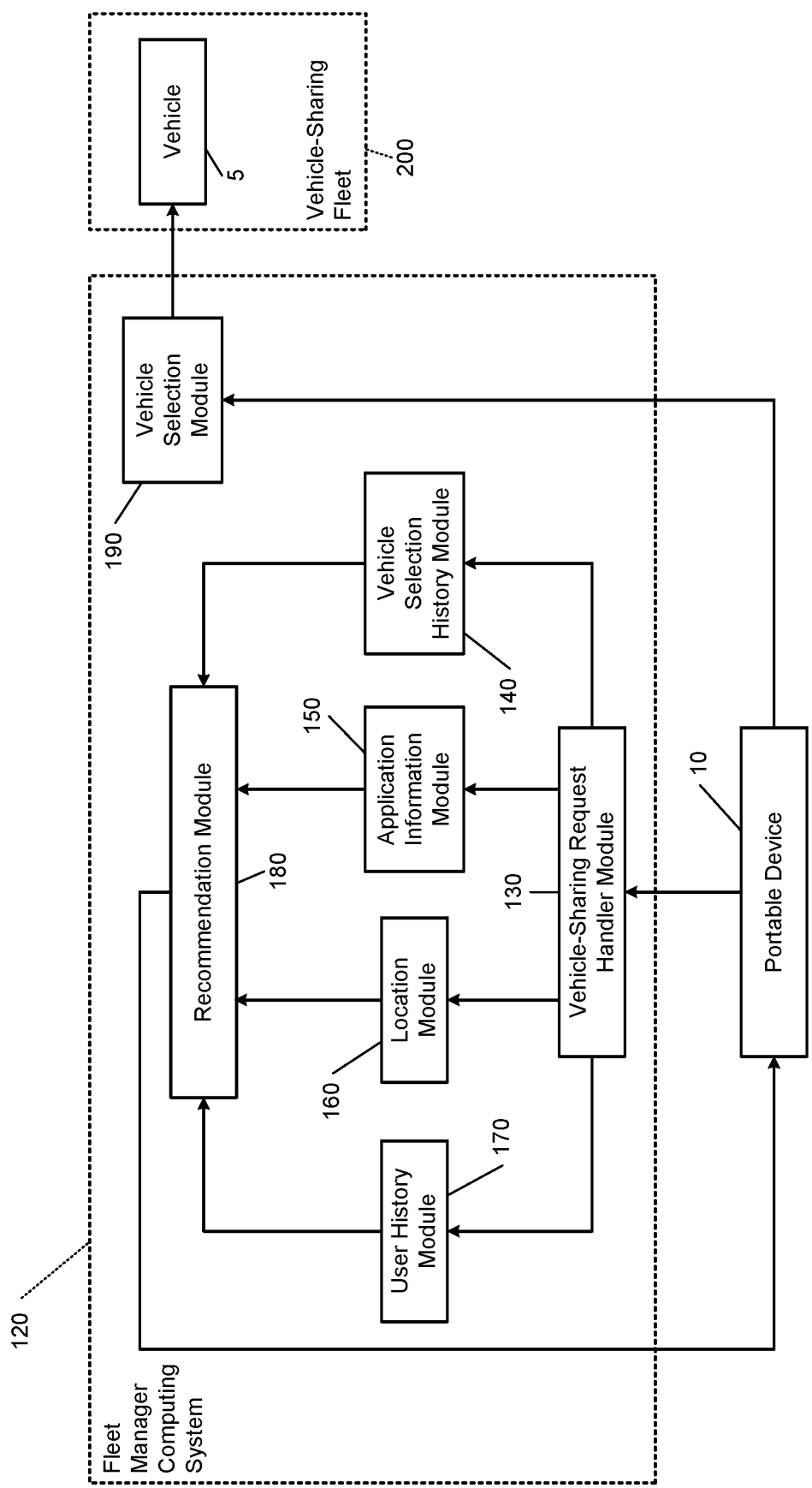
FIG. 5 illustrates a detailed example functional block diagram of a fleet manager computing system according to the present disclosure.

With reference to FIG. 5, a detailed illustration of a fleet manager computing system (FMCS) 120 is shown. The FMCS 120 may include a vehicle-sharing request handler module 130, a vehicle selection history module 140, an application information module 150, a location module 160, a user history module 170, a recommendation module 180, and a vehicle selection module 190. The modules of the FMCS 120 may be implemented by one or more processors that are configured to execute instructions stored in a non-transitory computer-readable medium, such as a RAM and/or ROM.

In one embodiment, the vehicle-sharing request handler module 130 is configured to receive vehicle-sharing requests generated by user 20 via the portable device 10. In response to receiving the vehicle-sharing request, the recommendation module 180 is configured to generate and transmit a set of vehicle recommendations based on vehicle selection history obtained by the vehicle selection history module 140; application information obtained by the application information module 150; location information obtained by the location module 160; and/or user history obtained by the user history module 170.

The vehicle selection history module 140 is configured to obtain vehicle selection history associated with the vehicle-sharing account of the user 20. The vehicle selection history may indicate a size and/or occupancy of vehicles used during prior vehicle-sharing sessions, a fuel efficiency of vehicles used during prior vehicle-sharing sessions, a type and/or model of vehicles used during prior vehicle-sharing sessions, and other identifying features of vehicles used during prior vehicle-sharing sessions.

The application information module 150 is configured to obtain application information associated with the portable device 10. The application information may be obtained from any application being executed by the portable device 10, and the application information may include any information that may be associated with the vehicle-sharing request. As an example, the application information may include information from a calendar application (e.g., the calendar application indicates that the user 20 has a date with his or her spouse scheduled for 7:00 PM on Tuesday). As another example, the application information may include information from a messaging application (e.g., a text messaging application, an email application, etc.) executing on the portable device 10 (e.g., a text messaging application indicates that the user 20 will be carpooling with his or her friends in order to arrive at a sporting event).

The location module 160 may be configured to obtain location information associated with the vehicle-sharing request. The location information may include originating and/or destination information (e.g., GPS coordinates) and an originating location type and/or destination type (e.g., the user's home, the user's place of employment, a restaurant, etc.). Additionally, the location information may include traffic information obtained from a mapping application being executed by the FMCS 120 or the portable device 10. The traffic information may be representative of traffic conditions corresponding to a set of roads that are associated with the originating location of the vehicle-sharing request and the destination. Furthermore, the location information may describe landform features associated with the vehicle-sharing request (e.g., the destination is a beach).

The user history module 170 is configured to obtain user history information associated with the vehicle-sharing account of the user 20. As an example, the user history information may include date and/or time information associated with prior vehicle-sharing sessions. As a more specific example, the date and/or time information may indicate that every Tuesday at 12:00 PM, the user 20 always selects a minivan from the vehicle recommendations in order to, for example, drive the user 20 and her coworkers to a particular restaurant for lunch. As another more specific example, the date and/or time information may indicate that every Saturday morning, the user 20 always selects a midsize vehicle from the vehicle recommendations in order to, for example, go to a grocery store. As another more specific example, the date and/or time information may indicate that on Friday evenings, the user 20 always selects a sports car from the vehicle recommendations in order to, for example, take his or her spouse out for dinner and a movie.

Additionally or alternatively, the user history information may include occupancy information associated with prior vehicle-sharing sessions (e.g., during the week, the vehicle-sharing requests associated with the user 20 generally designate 1-4 occupants; and on the weekends, the vehicle-sharing requests associated with the user 20 generally designate 4-7 occupants). Additionally or alternatively, the user history information may include session length and/or session distance information associated with prior vehicle-sharing sessions (e.g., the user 20 generally uses the vehicle sharing service for less than 2 hours and generally travels less than 50 miles using the vehicle sharing service). Furthermore, the user history information may indicate whether the user 20 has utilized an integrated transportation sharing service during prior vehicle-sharing sessions (i.e., the user 20 uses both the vehicle 5 and a scooter of a scooter-sharing service in order to arrive at the destination).

In response to receiving the vehicle-sharing request and based on the vehicle selection history, the application information, the location information, and/or the user history information, the recommendation module 180 is configured to generate a set of vehicle recommendations associated with the vehicle sharing fleet 200 that may be suitable for the user 20. As an example, the recommendation module 180 may implement any suitable scoring algorithm, matching algorithm, and/or ranking algorithm based on the vehicle selection history, the application information, the location information, and/or the user history information in order to generate the set of vehicle recommendations.

Subsequently, the user 20 may select, using the portable device 10, a vehicle from the set of vehicle recommendations in order to utilize the vehicle-sharing service. In response to the user selecting, for example, vehicle 5, which is included in the set of vehicles transmitted to and displayed by the portable device 10, the FMCS 120 is configured to assign the vehicle 5 to the user 20 and transmit the corresponding digital key to the portable device 10, thereby enabling the user 20 to operate the vehicle 5.

With reference to FIG. 6, a flowchart illustrating an example control algorithm 600 for generating a set of vehicle recommendations is shown. The control algorithm 600 begins at 604 when, for example, the user 20 generates a vehicle-sharing request via the portable device 10. At 608, the control algorithm 600 obtains, using the FMCS 120, the vehicle selection history, the application information, the location information, and the user history information associated with the user's vehicle-sharing account. At 612, the control algorithm 600 generates, using the FMCS 120, a first set of vehicle recommendations based on the vehicle selection history, the application information, the location information, and/or the user history information and transmits the first set to the portable device 10.

At 616, the control algorithm 600 determines, using the FMCS 120, whether the user 20 selects a vehicle from the set of vehicle recommendations. If so, the control algorithm 600 proceeds to 624; otherwise, the control algorithm 600 proceeds to 620. At 620, the control algorithm 600 generates, using the FMCS 120, an additional set of vehicle recommendations based on the vehicle selection history, the application information, the location information, and/or the user history information and transmits the additional set to the portable device 10. The control algorithm 600 then proceeds to 616.

At 624, the control algorithm 600 updates, using the FMCS 120, the vehicle selection history information associated with the user's vehicle-sharing account based on the selection. At 628, the control algorithm 600 assigns, using the FMCS 120, the selected vehicle to the user 20 of the portable device 10 and then ends at 632.

The present disclosure provides a method that includes obtaining, using a processor configured to execute instructions stored in a nontransitory computer-readable medium and, in response to receiving a vehicle-sharing request, contextual information, wherein the contextual information includes at least one of (i) vehicle selection history information associated with a vehicle-sharing account corresponding to the vehicle-sharing request, (ii) location information associated with the vehicle-sharing request, and (iii) application information associated with a portable device corresponding to the vehicle-sharing request, generating, using the processor, vehicle recommendations based on the contextual information, transmitting, using the processor, a first set of vehicle recommendations to the portable device, and assigning, using the processor and in response to receiving a signal indicating a selection of a vehicle from the first set of vehicle recommendations, the vehicle to a user associated with the vehicle-sharing request.

In other features, the method further includes updating, using the processor and in response to assigning the vehicle to the user, the vehicle selection history information associated with the vehicle-sharing account based on the vehicle.

In other features, the method further includes generating, using the processor and in response to receiving a signal indicating a non-selection of each vehicle of the first set of vehicle recommendations, a second set of vehicle recommendations based on the contextual information.

In other features, the contextual information includes user history information associated with the vehicle-sharing account and the user history information indicates at least one of, date information associated with prior vehicle-sharing sessions and time information associated with the prior vehicle-sharing sessions.

In other features, the user history information indicates at least one of occupancy information associated with the prior vehicle-sharing sessions and integrated transportation service history associated with the prior vehicle-sharing sessions.

In other features, the location information indicates at least one of an originating location associated with the vehicle-sharing request and a destination associated with the vehicle-sharing request.

In other features, the location information is associated with at least one of an originating location type associated with the vehicle-sharing request and a destination type associated with the vehicle-sharing request.

In other features, the vehicle selection history information indicates vehicle information associated with prior vehicle-sharing sessions and the vehicle information indicates at least one of a size of vehicles used during the prior vehicle-sharing sessions and an occupancy of vehicles used during the prior vehicle-sharing sessions.

In other features, the vehicle information indicates at least one of a fuel efficiency of vehicles used during the prior vehicle-sharing sessions and a type of vehicle used during the prior vehicle-sharing sessions.

In other features, the application information includes information from at least one of a calendar application of the portable device and a messaging application of the portable device.

The present disclosure also provides a system that includes a processor configured to execute instructions stored in a nontransitory computer-readable medium. The instructions include, in response to receiving a vehicle-sharing request, obtaining contextual information, wherein the contextual information includes at least one of (i) vehicle selection history information associated with a vehicle-sharing account corresponding to the vehicle-sharing request, (ii) location information associated with the vehicle-sharing request, and (iii) application information associated with a portable device corresponding to the vehicle-sharing request, generating vehicle recommendations based on the contextual information, transmitting a first set of vehicle recommendations to the portable device, and, in response to receiving a signal indicating a selection of a vehicle from the first set of vehicle recommendations, assigning the vehicle to a user associated with the vehicle-sharing request.

In other features, the instructions further include, in response to assigning the vehicle to the user, updating the vehicle selection history information associated with the vehicle-sharing account based on the vehicle.

In other features, the instructions further include, in response to receiving a signal indicating a non-selection of each vehicle of the first set of vehicle recommendations, generating a second set of vehicle recommendations based on the contextual information.

In other features, the contextual information includes user history information associated with the vehicle-sharing account and the user history information indicates at least one of date information associated with prior vehicle-sharing sessions and time information associated with the prior vehicle-sharing sessions.

In other features, the user history information indicates at least one of occupancy information associated with the prior vehicle-sharing sessions and integrated transportation service history associated with the prior vehicle-sharing sessions.

In other features, the location information indicates at least one of an originating location associated with the vehicle-sharing request and a destination associated with the vehicle-sharing request.

In other features, the location information is associated with at least one of an originating location type associated with the vehicle-sharing request and a destination type associated with the vehicle-sharing request.

In other features, the vehicle selection history information indicates vehicle information associated with prior vehicle-sharing sessions and the vehicle information indicates at least one of a size of vehicles used during the prior vehicle-sharing sessions and an occupancy of vehicles used during the prior vehicle-sharing sessions.

In other features, the vehicle information indicates at least one of a fuel efficiency of vehicles used during the prior vehicle-sharing sessions and a type of vehicle used during the prior vehicle-sharing sessions.

In other features, the application information includes information from at least one of a calendar application of the portable device and a messaging application of the portable device.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method comprising:
receiving, using a processor configured to execute instructions stored in a nontransitory computer-readable medium, a vehicle-sharing request from a portable device of a user associated with the vehicle-sharing request;
obtaining, using the processor, application information from the portable device, the application information indicating a time of a scheduled event of the user retrieved from at least one of a calendar application and a text messaging application of the portable device;
obtaining, using the processor, user history information indicating date and time information and a type of vehicle used by the user during prior vehicle-sharing sessions;
generating, using the processor, vehicle recommendations based on the application information and the user history information;
transmitting, using the processor, the vehicle recommendations to the portable device;
receiving, using the processor, a signal indicating a selection of a vehicle from the vehicle recommendations;
assigning, using the processor, the vehicle to the user associated with the vehicle-sharing request;
transmitting, using the processor, a digital key to the portable device, the digital key enabling the user to unlock and enter the vehicle selected from the vehicle recommendations;
obtaining, using an interior camera of the vehicle, image data of the user;
authenticating, using an electronic control module of the vehicle, the user based on the image data of the user; and
enabling, using the electronic control module, the user to activate the vehicle in response to authenticating the user.

2. The method of claim 1, further comprising updating, using the processor and in response to assigning the vehicle to the user, the vehicle selection history information associated with the vehicle-sharing account based on the vehicle.

3. The method of claim 1, further comprising generating, using the processor and in response to receiving a signal indicating a non-selection of each vehicle of the vehicle recommendations, second vehicle recommendations based on the application information and the user history information.

4. The method of claim 1, wherein the user history information additionally indicates at least one of:
occupancy information associated with the prior vehicle-sharing sessions; and
integrated transportation service history associated with the prior vehicle-sharing sessions.

5. The method of claim 1, wherein the vehicle-sharing request includes location information indicating at least one of an originating location associated with the vehicle-sharing request and a destination associated with the vehicle-sharing request.

6. The method of claim 5, wherein the location information is associated with at least one of an originating location type associated with the vehicle-sharing request and a destination type associated with the vehicle-sharing request.

7. The method of claim 1, wherein:
the user history information indicates vehicle information associated with the prior vehicle-sharing sessions; and
the vehicle information indicates at least one of:
a size of vehicles used during the prior vehicle-sharing sessions; and
an occupancy of vehicles used during the prior vehicle-sharing sessions.

8. The method of claim 7, wherein the vehicle information indicates at least one of:
a fuel efficiency of vehicles used during the prior vehicle-sharing sessions; and
a type of vehicle used during the prior vehicle-sharing sessions.

9. A system comprising:
a processor configured to execute instructions stored in a nontransitory computer-readable medium, wherein the instructions include:
receiving a vehicle-sharing request from a portable device of a user associated with the vehicle-sharing request;
in response to receiving the vehicle-sharing request, obtaining application information from the portable device corresponding to the vehicle-sharing request, the application information indicating a time of a scheduled event of the user retrieved from at least one of a calendar application and a text messaging application of the portable device;

obtaining user history information indicating date and time information and a type of vehicle used by the user during prior vehicle-sharing sessions;

generating vehicle recommendations based on the application information and the user history information;

transmitting the vehicle recommendations to the portable device;

receiving a signal indicating a selection of a vehicle from the vehicle recommendations;

assigning the vehicle to a user associated with the vehicle-sharing request;

transmitting a digital key to the portable device, the digital key enabling the user to unlock and enter the vehicle selected from the vehicle recommendations;

obtaining image data of the user from an interior camera of the vehicle;

authenticating the user based on the image data of the user; and enabling the user to activate the vehicle in response to authenticating the user.

10. The system of claim 9, wherein the instructions further comprise, in response to assigning the vehicle to the user, updating the vehicle selection history information associated with the vehicle-sharing account based on the vehicle.

11. The system of claim 9, wherein the instructions further comprise, in response to receiving a signal indicating a non-selection of each vehicle of the vehicle recommendations, generating second vehicle recommendations based on the application information and the user history information.

12. The system of claim 9, wherein the user history information additionally indicates at least one of:
occupancy information associated with the prior vehicle-sharing sessions; and
integrated transportation service history associated with the prior vehicle-sharing sessions.

13. The system of claim 9, wherein the vehicle-sharing request includes location information indicating at least one of an originating location associated with the vehicle-sharing request and a destination associated with the vehicle-sharing request.

14. The system of claim 13, wherein the location information is associated with at least one of an originating location type associated with the vehicle-sharing request and a destination type associated with the vehicle-sharing request.

15. The system of claim 9, wherein:
the user history information indicates vehicle information associated with the prior vehicle-sharing sessions; and
the vehicle information indicates at least one of:
a size of vehicles used during the prior vehicle-sharing sessions; and
an occupancy of vehicles used during the prior vehicle-sharing sessions.

16. The system of claim 15, wherein the vehicle information indicates at least one of:
a fuel efficiency of vehicles used during the prior vehicle-sharing sessions; and
a type of vehicle used during the prior vehicle-sharing sessions.

* * * * *